United States Patent
Obara et al.

(10) Patent No.: US 7,257,294 B2
(45) Date of Patent: Aug. 14, 2007

(54) METHOD FOR PROCESSING TRANSPARENT MATERIAL, APPARATUS FOR PROCESSING THE SAME AND OPTICAL FUNCTION DEVICE

(75) Inventors: Minoru Obara, Tokyo (JP); Masanao Kamata, Tokyo (JP); Tetsuya Nagata, Tokyo (JP)

(73) Assignee: Keio University, Tokyo (JP)

( * ) Notice: Subject to any disclaimer, the term of this patent is extended or adjusted under 35 U.S.C. 154(b) by 320 days.

(21) Appl. No.: 11/087,740

(22) Filed: Mar. 24, 2005

(65) Prior Publication Data

US 2005/0271349 A1 Dec. 8, 2005

(30) Foreign Application Priority Data

Mar. 26, 2004 (JP) ............... 2004-091900

(51) Int. Cl.
*G02B 6/34* (2006.01)
(52) U.S. Cl. .................. 385/37; 430/290; 430/321
(58) Field of Classification Search ............ 430/290
See application file for complete search history.

(56) References Cited

U.S. PATENT DOCUMENTS 6,993,221 B2 * 1/2006 Mihailov et al. ............ 385/37

2001/0021293 A1 * 9/2001 Kouta et al. ............... 385/37
2005/0226287 A1 * 10/2005 Shah et al. ................. 372/25

FOREIGN PATENT DOCUMENTS

| JP | 09-311237 | 12/1997 |
| JP | 2002-311277 | 10/2002 |

* cited by examiner

*Primary Examiner*—Michelle Connelly-Cushwa
*Assistant Examiner*—Chris Chu
(74) *Attorney, Agent, or Firm*—Edward Angell Palmer & Dodge LLP

(57) ABSTRACT

The invention provides a method for processing a transparent material, which is applicable to universal materials and by which the propagation loss of an optical function device produced by changing the refractive index is slight. Femtosecond laser pulses are condensed by a lens, and a glass material being fused quartz is relatively moved, wherein a waveguide is formed by forming a continuous high refractive index area. Prior art optical pulses depicted in FIG. 1(*a*) are one-by-one femtosecond laser pulses at a pulse interval which is slightly shorter or longer than a thermal diffusion time (1 μs) of a substance. Optical pulses according to the invention, which are depicted in FIG. 1(*b*) are irradiated while using, as a set, two femtosecond laser pulses with a pulse interval which is around the electron lattice energy relaxation time (1 through 100 ps) of a substance.

5 Claims, 5 Drawing Sheets

PULSE TRAIN OF SINGLE PULSE FEMTOSECOND LASER

PULSE TRAIN OF DOUBLE PULSE FEMTOSECOND LASER

METHOD FOR PROCESSING TRANSPARENT MATERIAL, APPARATUS FOR PROCESSING THE SAME AND OPTICAL FUNCTION DEVICE

TECHNICAL FIELD

The present invention relates to a method for processing a transparent material, an apparatus for processing a transparent material and an optical function device, in particular, a method for processing a transparent material by which the optical propagation loss of a processed optical function device is small, an apparatus for processing the same and an optical function device.

BACKGROUND ART

Such a method is disclosed in Patent Document 1 that produces an optical waveguide by forming a continuous high refractive index area on the basis of continuously scanning a glass material utilizing the increase in the refractive index in the vicinity of the focal point when femtosecond laser pulses are focused inside transparent glass. The method has a feature in that the number of processes is smaller than a method for producing an optical waveguide device using a prior art ion exchange method and flame deposition method. In addition, with this method, since a change in the refractive index is induced only in the vicinity of the focal point of the laser, it is possible to produce a waveguide device having an arbitrary structure inside glass.

However, a fact that, in an optical waveguide produced by the femtosecond laser pulses, the propagation loss is larger than a waveguide produced by using a prior art flame deposition method, etc., remained unsolved problem in practical applications. It is considered that the causes of the propagation loss herein are a scattering loss due to density fluctuations and an incomplete-structure loss due to fluctuations in the core-clad boundary. Therefore, a method is disclosed in Patent Document 2, which reduces a loss in a waveguide by using a glass material including a dopant to control the refractive index.

[Patent Document 1] Japanese Unexamined Patent Application Publication No. Hei-9-311237
[Patent Document 2] Japanese Unexamined Patent Application Publication No. 2002-311277

DISCLOSURE OF INVENTION

Problem to be Solved by the Invention

However, multiusability is lacking since materials employed for the method of using a glass material including a dopant to control the refractive index are limited.

The invention was developed in view of the above-described problems, and it is therefore an object of the invention to provide a method, to which universal materials can be employed, for processing a transparent material, in which the propagation loss of an optical function device produced by changing the refractive index is small, an apparatus for processing the same, and an optical function device produced by the same method.

Means for Solving the Problem

A method for processing a transparent material according to the invention is featured in that, a plurality of optical pulses existing within duration of time during which induction of a change in the refractive index is completed are used as a set, and the refractive index in a predetermined area of a transparent material is changed by repeatedly irradiating the set with a longer interval than the duration of time.

Also, by the amplitude of the initial optical pulses of the plurality of optical pulses being smaller than the amplitude of other subsequent pulses, it is possible to further reduce the loss.

Further, since the duration of time is 1 through 100 ps (including both ends) where the transparent material is fused quartz, the duration of time is preferable when it is applied to fused quartz that is widely utilized as a material of an optical function device.

In addition, an apparatus for processing a transparent material according to the invention is featured in that a plurality of optical pulses existing within duration of time of 1 through 100 ps (including both ends) are used as a set, and the refractive index of a predetermined area of fused quartz is changed by repeatedly irradiating the corresponding set with a longer interval than the duration of time during which induction of a change in the refractive index of the fused quartz is completed.

Also, an optical function device according to the invention is featured in that the same is processed by the method for processing a transparent material.

EFFECT OF THE INVENTION

The propagation loss of an optical function device, for example, an optical waveguide, which is produced by the invention, is reduced in comparison with the propagation loss of an optical function device produced by prior art methods, whereby an optical-function device such as an optical waveguide produced by femtosecond laser pulses can be made into practical applications.

The present specification includes contents disclosed in the specification and/or the drawings of Japanese Patent Application No. 2004-091900 whose priority is claimed in the present application.

DESCRIPTION OF REFERENCE SIGNS

11 Laser
12 Objective lens
13 Transparent material
14 Waveguide
BS Beam splitter
M Mirror
VA Attenuator

BEST MODE FOR CARRYING OUT THE INVENTION

Hereinafter, a detailed description is given of a best embodiment of the invention with reference to the accompanying drawings.

EMBODIMENT 1

Figure 1:
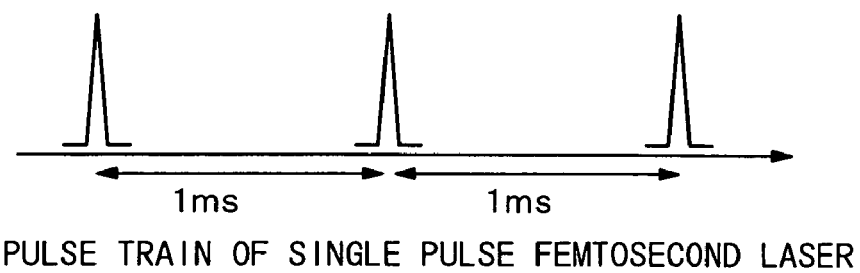
FIG. 1 is a figure describing optical pulses used in a method for processing a transparent material according to one embodiment of the invention.
Figure 1:
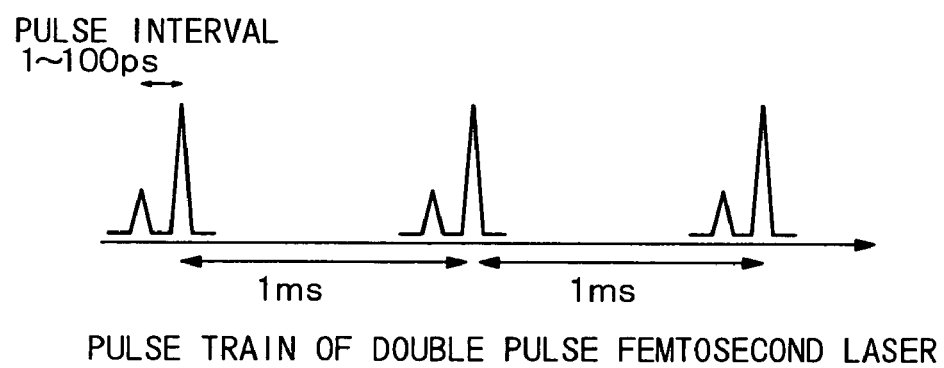

FIG. 1 is a figure describing optical pulses used for a method for processing a transparent material according to one embodiment of the invention. FIG. 1(a) shows prior art optical pulses, and FIG. 1(b) shows optical pulses according to the embodiment. In the embodiment, a description is given of a case where fused quartz is taken as an example of a transparent material whose refractive index is changed, and a produced optical function device is a waveguide. Femtosecond laser pulses are employed as optical pulses used to increase the refractive index in an area that becomes a waveguide of fused quartz, in which a waveguide is produced by focusing the femtosecond laser pulses by a lens and forming a continued high refractive index area while relatively moving a glass material being fused quartz.

Prior art optical pulses depicted in FIG. 1(a) are one-by-one femtosecond laser pulses at a pulse interval which is slightly shorter or longer than a thermal diffusion time (1 μs) of a substance. However, in these cases, since the pulse interval of laser pulses is remarkably longer than the duration of time in which a change in the refractive index is induced, a next pulse is irradiated after a structural change inside glass due to a previous pulse is completely terminated.

Optical pulses according to the embodiment, which are depicted in FIG. 1(b), are irradiated while using two femtosecond laser pulses with the pulse interval of about electron lattice energy relaxation time (1 through 100 ps) of a substance as a set. That is, a next laser pulse is irradiated before induction of a change in the refractive index resulting from a previously irradiated laser pulse is completed. And, the set is irradiated at a predetermined interval like one pulse according to the prior art. The repetition period of the set may be established similar to the repetition period of pulses according to the prior art. That is, the period is established for longer duration of time than the duration of time during which induction of a change in the refractive index is completed.

Figure 2:
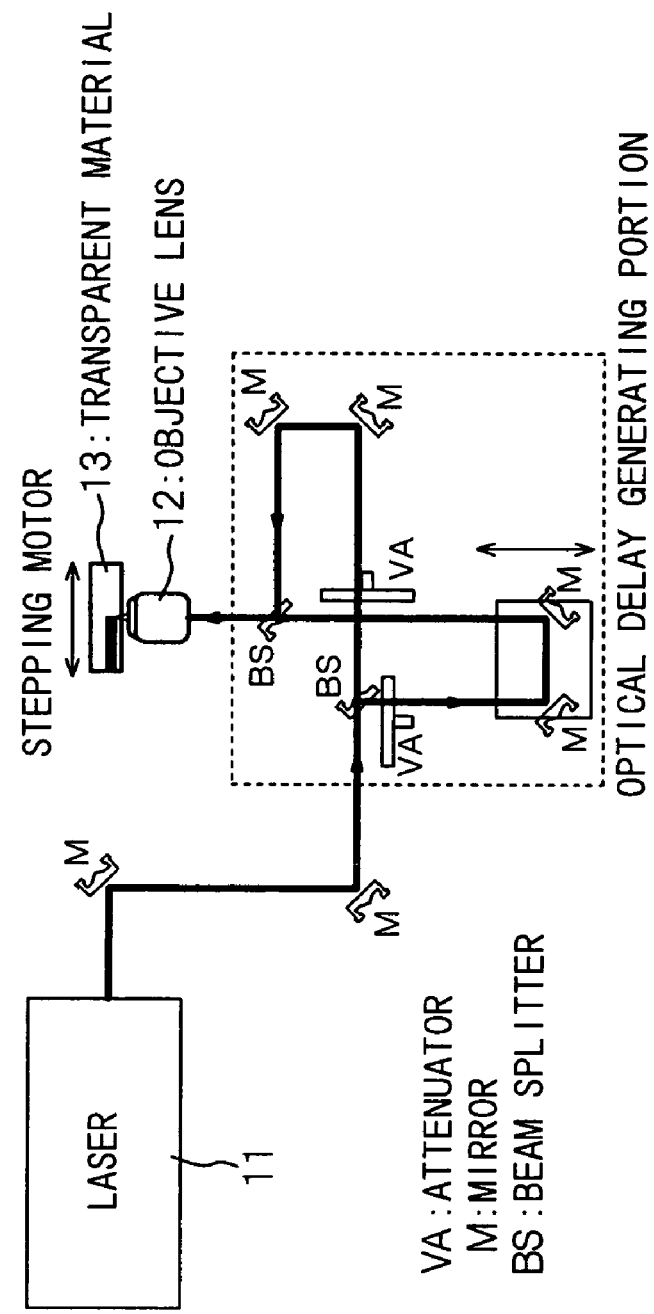
FIG. 2 is a figure depicting a configuration of an apparatus for processing a transparent material to achieve a method for processing a transparent material according to the embodiment.

FIG. 2 is a figure depicting a configuration of an apparatus for processing a transparent material to achieve the method for processing a transparent material according to the embodiment. An apparatus for processing a transparent material according to the embodiment is composed of a laser 11, an objective lens 12, an attenuator VA, a mirror M, and a beam splitter BS. The laser 11 is a regeneratively amplified Ti-sapphire femtosecond laser (pulse width 100 fs, repetition frequency 1 kHz, and center wavelength 800 nm). A femtosecond laser pulse generated from the laser 11 is split into two by the beam splitter BS (branching filter), one of which is delayed by an optical delay unit capable of varying the delay amount, which is composed of the mirror M, and the interval of pulses is made variable from 0 through 200 ps. Furthermore, two laser pulses are multiplexed by the beam splitter BS (multiplexer), wherein the pulses are condensed inside a transparent material 13 consisting of fused quartz using the objective lens 12 whose magnification is 20 times, and the transparent material 13 is scanned at 50 μm/s vertically to the optical axis direction using a stepping motor. The propagation loss of a waveguide that is produced under the conditions that the pulse interval is 3 ps, the first and second power ratio of pulses is 1:5, and the average power of the laser 11 is 0.19 mW is 0.2 dB/cm. And, the typical propagation loss of a waveguide produced by a conventional femtosecond laser under the conditions equivalent thereto is approximately 3 dB/cm. Although fused quartz is used as the transparent material 13, the material is not limited thereto as long as the material can induce a change in the refractive index. That is, rare earth doped glass and high polymer resin may be employed. Polarization of a plurality of optical pulses existing within the duration of time during which induction of a change in the refractive index is completed is not necessarily the same, wherein the polarization may differ. In addition, a spatial phase modulator may be used in addition to the above-described method as the method for generating a plurality of optical pulses existing within the duration of time during which induction of a change in the refractive index is completed. Although the above-described pulse width is 100 fs, it is not necessary that the pulse width is limited thereto. Any femtosecond pulse capable of producing a waveguide may be used. Actually, femtosecond pulses from 20 fs through 500 fs may be used to produce a waveguide.

Figure 3:
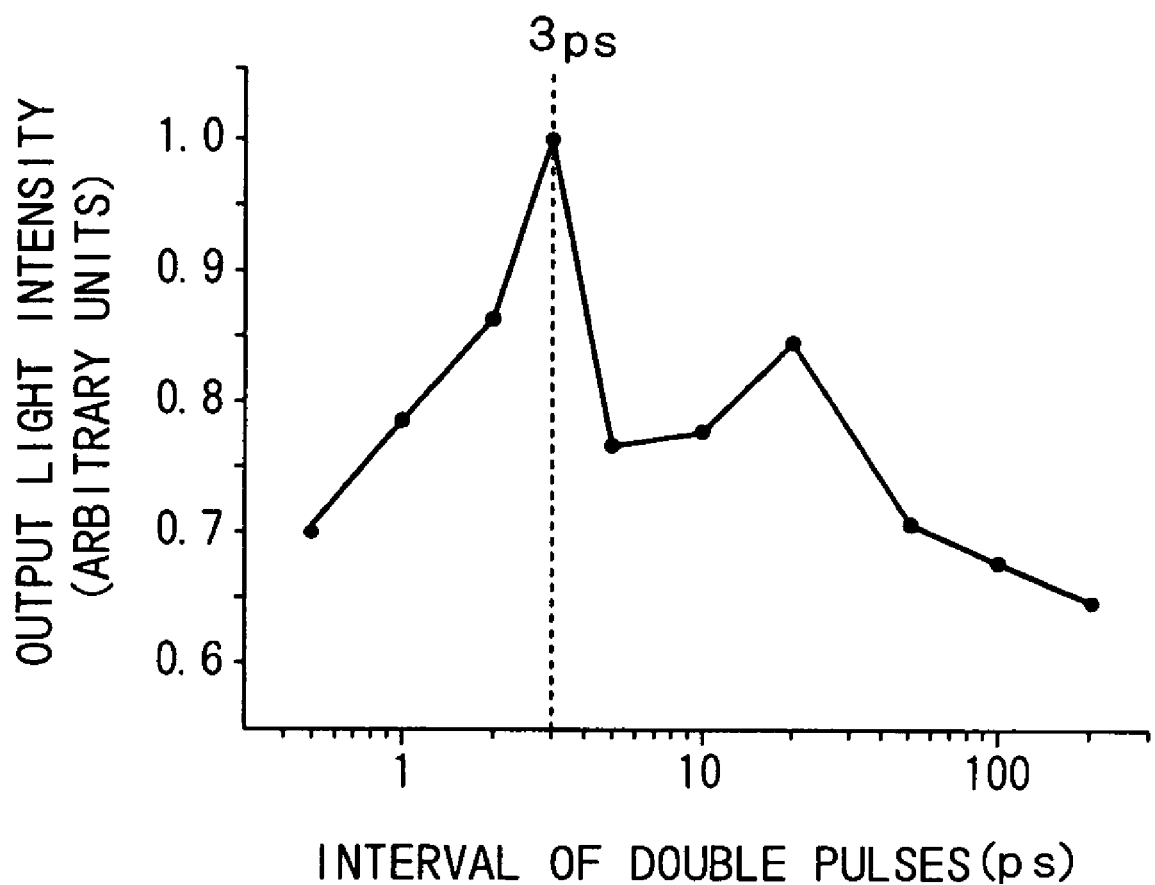
FIG. 3 is a graph depicting the relationship between pulse intervals and output light intensity of an optical waveguide.

FIG. 3 is a graph depicting the relationship between the pulse intervals and the output light intensity of a waveguide. The graph depicts changes in the intensity of output light from a waveguide when an He—Ne laser whose wavelength is 632.8 nm is coupled to a waveguide produced while gradually increasing the pulse interval of double pulses, which become a set, from 0 ps to 200 ps. As a result, it is understood that the intensity of the output light is maximized at the pulse interval of 3 ps, and a large intensity of the output light is obtained from 1 through 100 ps (including both the ends). Over 100 ps of the pulse interval, almost no change is found in the propagation loss, and the propagation loss is made equivalent to the propagation loss of a waveguide produced without using any double pulse. Conditions such as an appropriate lens, scanning speed, pulse interval, power ratio and average power, etc., are determined based on the material. Based thereon, it can be confirmed that the propagation loss is reduced in a waveguide produced by using double pulses.

The reasons why reduction in the propagation loss of a waveguide is achieved by using double pulses are considered as follows. Non-linear absorption dependent on the intensity of so-called multiphoton absorption occurs in the vicinity of the focal point, wherein bound electrons are excited to a conduction band. Electrons in the conduction band absorb the energy of the remaining laser pulses, and high-density electron plasma is formed. And, high energy electrons in the plasma are brought into collision with lattice and energy is transferred into the lattice, wherein heat and shock waves are generated, resulting in a change in the refractive index. In fact, although permanent material function modification such as a change in the refractive index occurs in the final stage, it becomes possible to irradiate next laser pulses about in the stages that the material function modification occurs, by adjusting the pulse interval of double pulses. It is considered that, by irradiating the second laser pulse while the structure is changing with time by irradiating the first laser pulse, the scattering loss and loss due to incomplete structure can be reduced by the action that rapid changes are relieved.

With the invention, laser pulses enable reduction in the loss of waveguides by irradiating laser pulses at pulse intervals which cannot be generated by conventional femtosecond pulse laser equipment per se. The invention may be applicable to transparent materials other than the fused quartz. The appropriate irradiation conditions are determined depending on the materials. Also, it is possible to produce a low-loss waveguide without carrying out a dopant treatment of a glass material in advance. In addition, it is possible to produce a waveguide device by being easily combined with the previously proposed methods.

Figure 4:
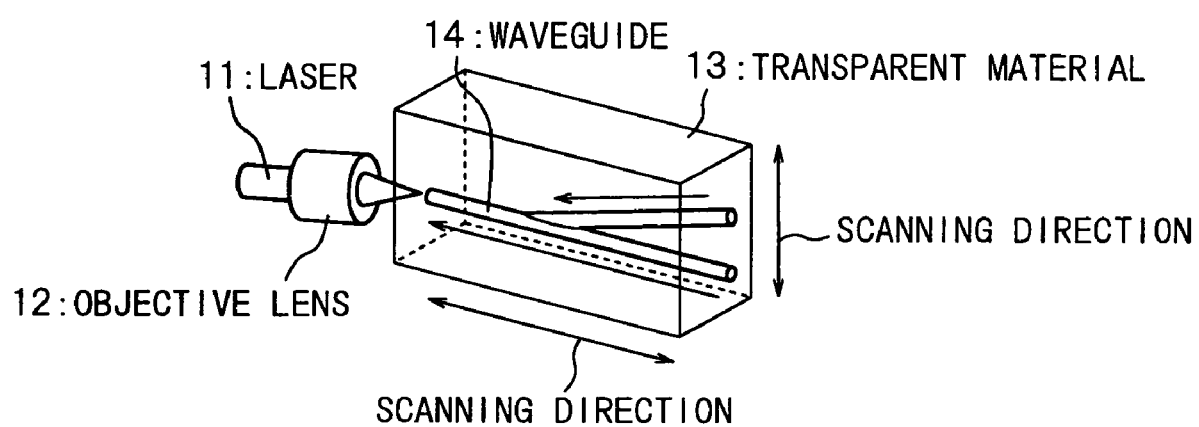
FIG. 4 is a figure describing a method for producing a Y-type branching waveguide according to the embodiment.

FIG. 4 is a figure describing a method for producing a Y-type branching waveguide according to the embodiment. Double femtosecond laser pulses generated from the laser 11 are focused in an area, which becomes a Y-type branching waveguide 14 of the transparent material 13, by means of the objective lens 12, and the transparent material 13 is relatively moved, whereby the waveguide 14 is formed by forming a continuous high refractive index area. The Y-type branching waveguide is a waveguide device capable of multiplexing and splitting light and is very important as an optical communication device. By producing the waveguide using the femtosecond laser, it is possible to produce a branching waveguide which is branched in a plurality of directions three-dimensionally. Herein, a lowering in the propagation loss is requisite, wherein the invention may be preferably applicable thereto.

Figure 5:
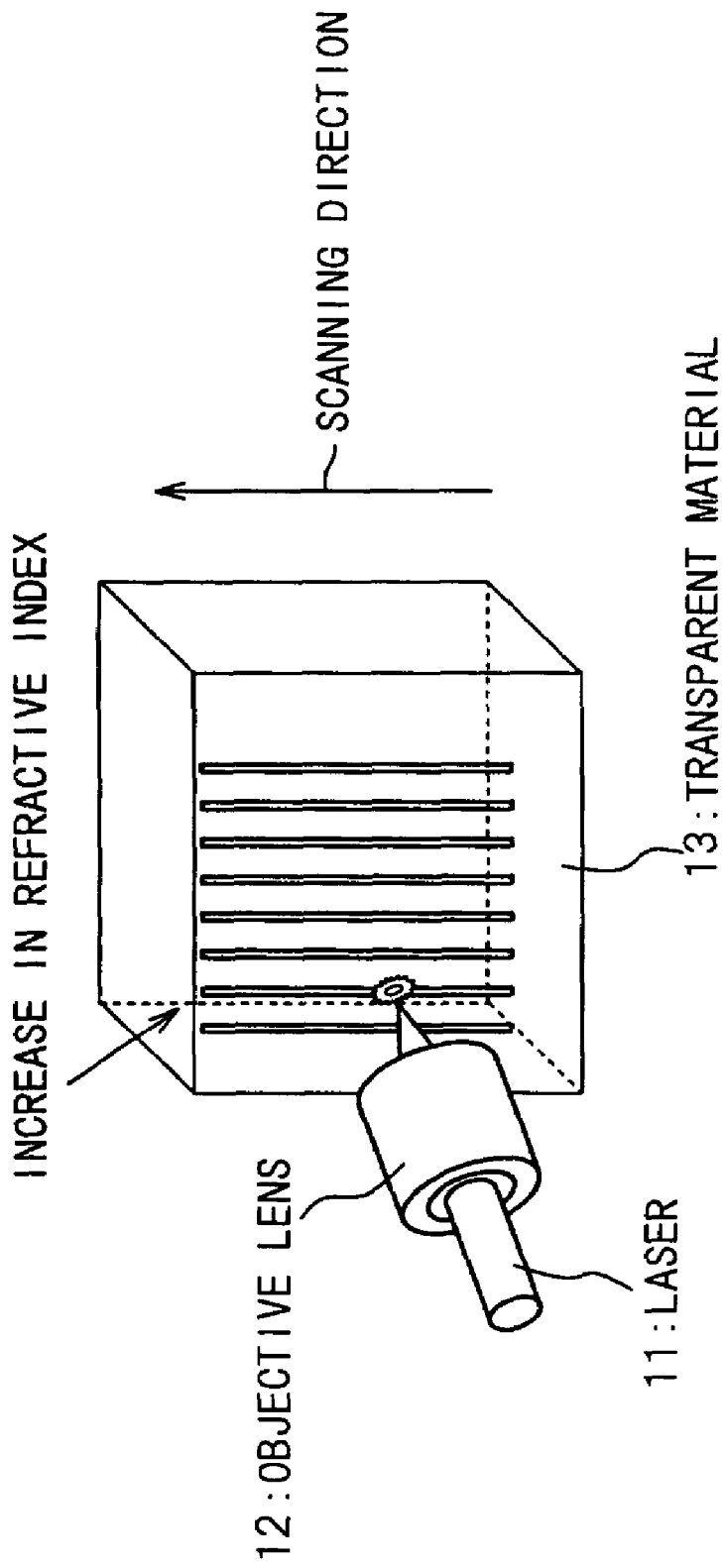
FIG. 5 is a figure depicting a method for producing an optical diffraction grating according to the embodiment.

FIG. 5 is a figure describing a method for producing an optical diffraction grating according to the embodiment. Since the laser 11, objective lens 12, and transparent material 13 are identical to those depicted in FIG. 4, overlapping description thereof is omitted. Since the scattering loss can be reduced by using the method according to the invention when producing an optical grating in the transparent material 13, further greater diffraction efficiency can be obtained.

Also, when the embodiment is applied to Bragg diffraction grating, etc., it is possible to reduce the scattering loss. Therefore, the invention may also be applicable thereto.

In addition, the invention is not limited to the embodiment.

A set of pulses may be composed of three pulses or more.

Where the amplitude of the first pulse of a plurality of pulses of a set is smaller than the amplitude of other subsequent pulses, the loss can be further reduced.

All the publications, patents and patent applications, which are cited in the present specification, are included in the specification as they are.

What is claimed is:

1. A method for processing a transparent material, comprising the steps of:
    Using, as a set, a plurality of optical pulses existing within duration of time during which induction of a change in a refractive index is completed;
    repeatedly irradiating said set with a longer interval than said duration of time; and
    changing the refractive index in a predetermined area of said transparent material.

2. The method for processing a transparent material according to claim 1, wherein the amplitude of first optical pulse of said plurality of optical pulses is smaller than the amplitude of other subsequent optical pulses.

3. The method for processing a transparent material according to claim 1 or 2, wherein said duration of time is 1 through 100 ps (including both ends) where said transparent material is fused quartz.

4. An apparatus for processing a transparent material for using, as a set, a plurality of optical pulses existing within duration of time of 1 through 100 ps (including both ends), repeatedly irradiating said set with a longer interval than the time at which induction of a change in the refractive index of fused quartz is completed; and changing the refractive index of a predetermined area of the fused quartz.

5. An optical function device processed by the method, for processing a transparent material, including the steps of using, as a set, a plurality of optical pulses existing within duration of time during which induction of a change in a refractive index is completed; repeatedly irradiating said set with a longer interval than said duration of time; and changing the refractive index in a predetermined area of the transparent material.

* * * * *